(12) United States Patent
Matsuda

(10) Patent No.: US 11,383,695 B2
(45) Date of Patent: Jul. 12, 2022

(54) HYBRID VEHICLE

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

(*) Notice: Subject to any disclaimer, the term of this patent is extended or adjusted under 35 U.S.C. 154(b) by 264 days.

(21) Appl. No.: 16/496,059

(22) PCT Filed: Feb. 28, 2018

(86) PCT No.: PCT/JP2018/007592
§ 371 (c)(1),
(2) Date: Sep. 20, 2019

(87) PCT Pub. No.: WO2018/173670
PCT Pub. Date: Sep. 27, 2018

(65) Prior Publication Data
US 2020/0108822 A1 Apr. 9, 2020

(30) Foreign Application Priority Data

Mar. 22, 2017 (JP) .............................. JP2017-055803

(51) Int. Cl.
| B60W 10/02 | (2006.01) |
| B60W 10/08 | (2006.01) |
| B60W 20/30 | (2016.01) |
| B60K 6/387 | (2007.10) |
| B60K 6/26 | (2007.10) |
| B60W 10/11 | (2012.01) |
| B62K 11/04 | (2006.01) |

(52) U.S. Cl.
CPC ............... *B60W 20/30* (2013.01); *B60K 6/26* (2013.01); *B60K 6/387* (2013.01); *B60W 10/02* (2013.01);
(Continued)

(58) Field of Classification Search
CPC ...... B60W 20/30; B60W 10/02; B60W 10/08; B60W 2300/36; B60W 2710/022;
(Continued)

(56) References Cited

U.S. PATENT DOCUMENTS

2003/0217617 A1* 11/2003 Sakamoto ............. F16H 37/065
74/665 B
2007/0235235 A1 10/2007 Fukami et al.
(Continued)

FOREIGN PATENT DOCUMENTS

| CN | 1593976 A * | 3/2005 | ............. B60K 41/06 |
| EP | 0966627 B1 * | 7/2003 | ............. F16H 3/126 |

(Continued)

OTHER PUBLICATIONS

EP0966627 machine translation corresponding to WO9840647A1 filed Sep. 22, 2021. (Year: 2021).*

*Primary Examiner* — Tisha D Lewis
(74) *Attorney, Agent, or Firm* — Alleman Hall Creasman & Tuttle LLP

(57) ABSTRACT

A hybrid vehicle includes: an internal combustion engine; an electric motor; a controller; a transmission including an input shaft that receives power inputted from the internal combustion engine and the electric motor and an output shaft that outputs power to a drive wheel; and a clutch disposed in a first power transmission route between the internal combustion engine and the input shaft. The electric motor is connected to the input shaft so as to transmit power to the input shaft through a second power transmission route different from the first power transmission route. The controller changes the manner of controlling the electric motor upon switching of the state of power transmission from the internal combustion engine and the electric motor.

19 Claims, 8 Drawing Sheets

(52) U.S. Cl.
CPC ............ *B60W 10/08* (2013.01); *B60W 10/11* (2013.01); *B62K 11/04* (2013.01); *B60W 2300/36* (2013.01); *B60W 2710/022* (2013.01); *B60W 2710/08* (2013.01); *B60W 2710/1005* (2013.01)

(58) Field of Classification Search
CPC ...... B60W 2710/08; B60W 2710/1005; B60K 6/26; B60K 6/387; B62K 11/04
See application file for complete search history.

(56) References Cited

U.S. PATENT DOCUMENTS

2014/0238758 A1* 8/2014 Barth .................... B60K 6/547
180/65.25

2016/0375890 A1 12/2016 Saito et al.

FOREIGN PATENT DOCUMENTS

| | | | | |
|---|---|---|---|---|
| EP | 2684755 A1 | | 1/2014 | |
| FR | 2834248 A1 | * | 7/2003 | ............ B60K 6/485 |
| JP | S48047704 U1 | | 6/1973 | |
| JP | H1189008 A | | 3/1999 | |
| JP | 2000245016 A | | 9/2000 | |
| JP | 2001342864 A | | 12/2001 | |
| JP | 2003159967 A | | 6/2003 | |
| JP | 2007269253 A | | 10/2007 | |
| JP | 2013067252 A | | 4/2013 | |
| JP | 2013193613 A | * | 9/2013 | ............ B60W 10/08 |
| JP | 2015027854 A | * | 2/2015 | ............ B60W 10/08 |
| JP | 2015077887 A | | 4/2015 | |
| JP | 2017013543 A | | 1/2017 | |

* cited by examiner

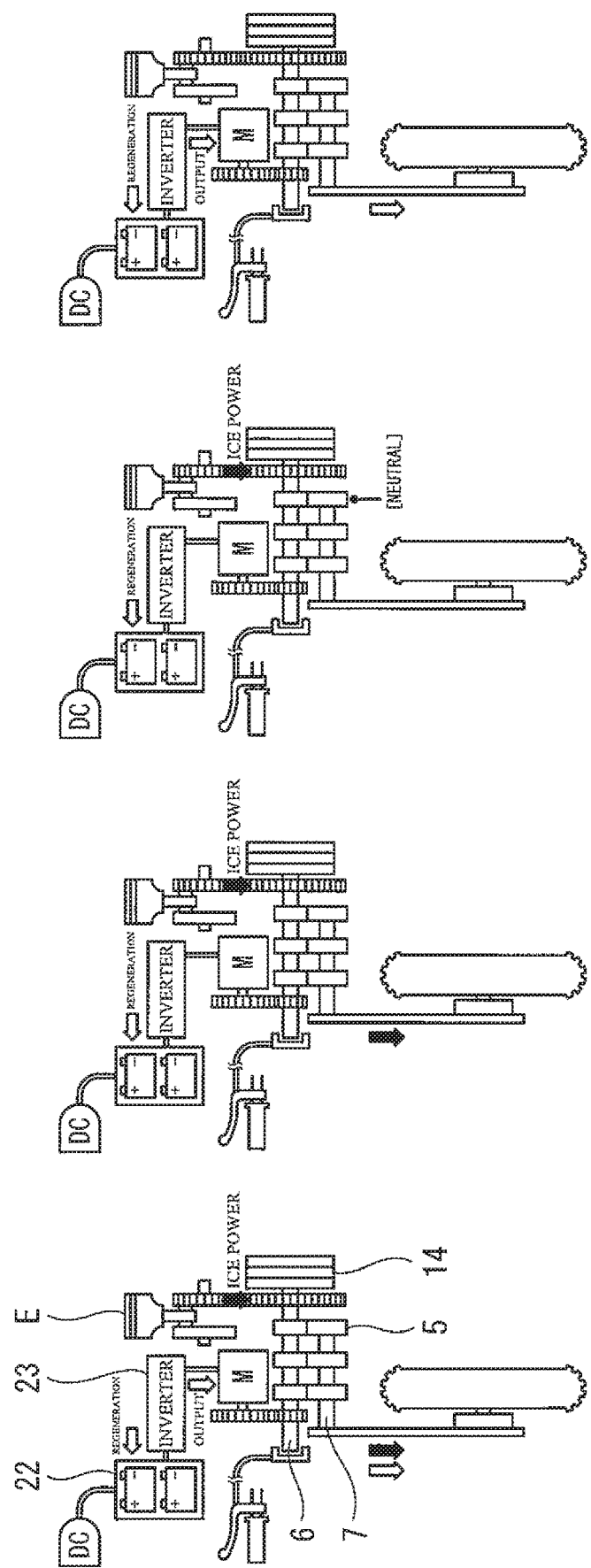

| | TRANSMISSION | CLUTCH | ENGINE | MOTOR |
|---|---|---|---|---|
| ENGINE-MOTOR-DRIVEN TRAVEL MODE | ENGAGED (FIRST TO SIXTH GEAR POSITIONS) | ENGAGED (CONNECTION) | OPERATED FOR TRAVEL | OPERATED FOR TRAVEL (REGENERATION) |
| ENGINE-DRIVEN TRAVEL MODE | ENGAGED (FIRST TO SIXTH GEAR POSITIONS) | ENGAGED (CONNECTION) | OPERATED FOR TRAVEL | FREE RUN (REGENERATION) |
| ELECTRICITY GENERATION MODE | DISENGAGED (NEUTRAL) | ENGAGED (CONNECTION) | OPERATED FOR ELECTRICITY GENERATION | GENERATING ELECTRICITY |
| MOTOR-DRIVEN TRAVEL MODE | ENGAGED (FIRST TO SIXTH GEAR POSITIONS) | DISENGAGED (DISCONNECTION) | STOPPED | OPERATED FOR TRAVEL (REGENERATION) |

Fig.4

HYBRID VEHICLE

TECHNICAL FIELD

The present invention relates to a hybrid vehicle including an internal combustion engine and an electric motor as power sources for travel of the vehicle.

BACKGROUND ART

Patent Literature 1 discloses a hybrid vehicle configured to drive a drive wheel using not only power of an internal combustion engine but also power of an electric motor.

CITATION LIST

Patent Literature

Patent Literature 1: Japanese Laid-Open Patent Application Publication No. 2007-269253

SUMMARY OF INVENTION

Technical Problem

However, in the hybrid vehicle of Patent Literature 1, the electric motor is connected to a crankshaft of the internal combustion engine and, unfortunately, pumping loss occurs during operation of the electric motor due to the internal combustion engine causing resistance.

It is therefore an object of the present invention to reduce energy loss that occurs when a drive wheel is driven by an electric motor alone.

Solution to Problem

A hybrid vehicle according to an aspect of the present invention includes: an internal combustion engine; an electric motor; a controller that controls the electric motor; a transmission including an input shaft that receives power inputted from the internal combustion engine and the electric motor and an output shaft that outputs power to a drive wheel; and a clutch disposed in a first power transmission route between the internal combustion engine and the input shaft, wherein the electric motor is connected to the input shaft so as to transmit power to the input shaft through a second power transmission route different from the first power transmission route, and the controller changes the manner of controlling the electric motor upon switching of the state of power transmission from the internal combustion engine and the electric motor.

With this configuration, transmission of power of the electric motor to the crankshaft of the internal combustion engine can be prevented by clutch disconnection, and for this purpose the clutch disposed between the internal combustion engine and the transmission can be used. Thus, the need for a complicated system for power transmission switching is eliminated, and the energy loss occurring when the drive wheel is driven by the electric motor alone can be reduced. Additionally, since the manner of controlling the electric motor is changed upon switching of the state of power transmission, suitable motor control can be achieved for each of the different power transmission states.

The transmission may be switchable to a neutral state, and when the transmission is in the neutral state, the controller may control the electric motor in such a manner that the electric motor acts as an electricity generator to generate electricity from power transmitted to the electric motor from the internal combustion engine via the input shaft.

With this configuration, the electric motor can be caused to generate electricity by making use of the neutral state of the transmission.

The hybrid vehicle may further include a first sensor that detects a gear shifting command to shift the transmission, the gear shifting command being given by a driver, and upon detection of the gear shifting command by the first sensor, the controller may control the electric motor in such a manner that a difference in rotational speed between the input shaft and the output shaft becomes smaller than that occurring before the detection of the gear shifting command.

With this configuration, the rotational speed adjustment by the electric motor allows smooth gear shifting even when power transmission from the electric motor to the input shaft is maintained.

The hybrid vehicle may further include: a second sensor that detects the neutral state of the transmission or detects a command to shift the transmission into the neutral state; and a third sensor that detects which state the clutch is in or detects a command to actuate the clutch, and the controller may control the electric motor based on outputs from the second sensor and the third sensor.

With this configuration, control of the electric motor can be accomplished according to the present state of the power transmission route or according to commands given by the driver concerning the power transmission state.

The hybrid vehicle may further include: a manual clutch actuation power transmission mechanism that delivers an operation force of a driver as clutch actuation power to the clutch; and a controlled clutch actuation power transmission mechanism that delivers power of a clutch actuator as clutch actuation power to the clutch.

With this configuration, the clutch actuation by an operation force of the driver and the clutch actuation by power of the clutch actuator can be selectively used for disconnection/connection of the clutch. This makes it easy to achieve improved performance.

The hybrid vehicle may further include: a clutch operation member operated by a driver and movable between an operative position and an inoperative position; a biasing member that biases the clutch operation member from the operative position toward the inoperative position; and a holding mechanism configured to hold the clutch operation member in the operative position.

With this configuration, the clutch operation member can be maintained in the operative position without the need for the driver to continue operating the clutch operation member.

The controller may have a control period during which a circuit of the electric motor is opened to bring the electric motor into a free run state when the clutch is in a connection state and the transmission is in a non-neutral state.

With this configuration, a time period during which the vehicle is traveling by relying substantially only on the internal combustion engine can be provided in the mode in which both power of the internal combustion engine and power of the electric motor are transmitted to the drive wheel.

The hybrid vehicle may be a motorcycle, in which the electric motor may be disposed in a space located rearward of a cylinder block of the internal combustion engine and above a crankcase of the internal combustion engine, the crankcase may house the transmission, and the electric motor may have a drive shaft configured to transmit power to the input shaft of the transmission on one side in a vehicle width direction.

With this configuration, the electric motor can be disposed close to the input shaft of the transmission, and size increase of the vehicle can be prevented.

A hybrid vehicle operation method according to an aspect of the present invention is a method of operating a hybrid vehicle including an internal combustion engine, an electric motor, a transmission including an input shaft that receives power inputted from the internal combustion engine and the electric motor and an output shaft that outputs power to a drive wheel, and a clutch disposed between the internal combustion engine and the input shaft, the method including: bringing the clutch into a disconnection state and the transmission into a non-neutral state to transmit power from the electric motor to the input shaft through a power transmission route different from the clutch and transmit power of the electric motor to the drive wheel; bringing the clutch into a connection state and the transmission into a neutral state to transmit power of the internal combustion engine to the electric motor via the input shaft and cause the electric motor to generate electricity; and bringing the clutch into the connection state and the transmission into the non-neutral state to transmit power of the internal combustion engine and power of the electric motor to the drive wheel, and the manner of controlling the electric motor may be changed upon switching of the state of power transmission from the internal combustion engine and the electric motor.

With this method, internal combustion engine-driven travel, electrically-driven travel, and electricity generation operation can be selectively used in a suitable fashion, and the energy loss occurring when the drive wheel is driven by the electric motor alone can be reduced while avoiding an increase in the number of clutches. Additionally, since the manner of controlling the electric motor is changed upon switching of the state of power transmission, suitable motor control can be achieved for each of the different power transmission states.

Advantageous Effects of Invention

The present invention makes it possible to reduce energy loss that occurs when a drive wheel is driven by an electric motor alone.

BRIEF DESCRIPTION OF DRAWINGS

FIGS. 3A to 3D are diagrams illustrating the power transmission state of the vehicle of FIG. 1 in different modes.

FIG. 4 is a table illustrating the respective states of a transmission, a clutch, an engine, and an electric motor of the vehicle of FIG. 1 in different modes.

DESCRIPTION OF EMBODIMENTS

Hereinafter, embodiments will be described with reference to the drawings.

Figure 1:
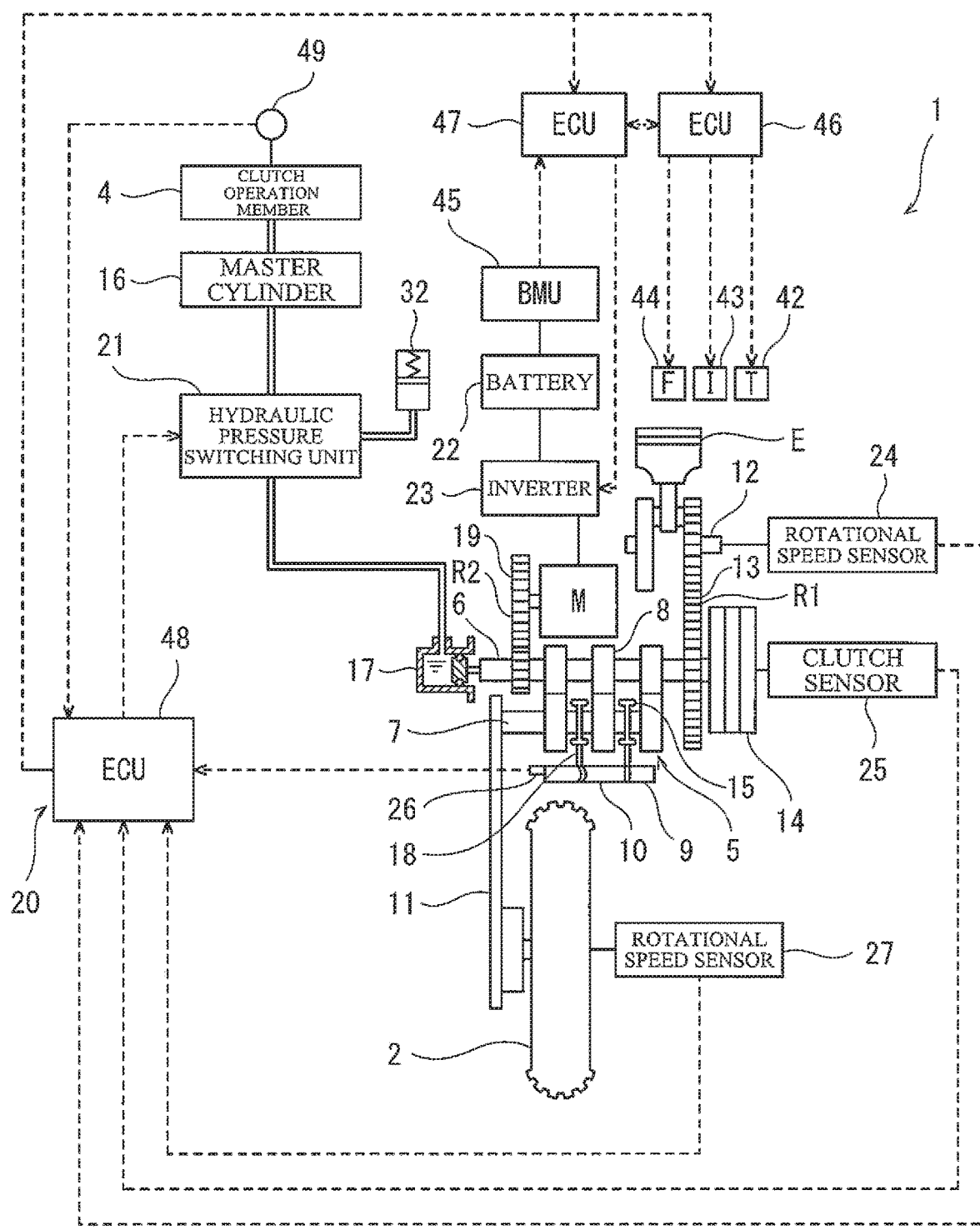
FIG. 1 is a block diagram of a hybrid vehicle according to an embodiment.

FIG. 1 is a block diagram of a hybrid vehicle 1 according to an embodiment. As shown in FIG. 1, the hybrid vehicle 1 is, for example, a motorcycle. The vehicle 1 includes an unillustrated driven wheel (front wheel) and a drive wheel 2 (rear wheel). The handle of the vehicle 1 includes a grip 3 (see FIG. 2) equipped with a clutch operation member 4 (e.g., a clutch lever). Switches for allowing the driver to select any of the modes described later are provided in the vicinity of the handle or a meter display.

The vehicle 1 includes an engine E (internal combustion engine) serving as a drive source for travel and as a drive source for electricity generation and further includes an electric motor M serving as a drive source for travel and as an electricity generator. The engine E and the electric motor M are disposed between the driven wheel which is the front wheel and the drive wheel 3 which is the rear wheel. The cylinder of the engine E extends in an upward/downward direction, and the electric motor M is disposed behind the cylinder of the engine E.

The vehicle 1 includes a transmission 5 that provides a conversion from power received from the engine E and/or electric motor M and that transmits the converted power to the drive wheel 2. The transmission 5 is housed in a crankcase disposed below the cylinder of the engine E, and the electric motor M is disposed above the crankcase. The transmission 5 includes an input shaft 6 and an output shaft 7. The input shaft 6 receives power inputted from the engine E and electric motor M. The output shaft 7 transmits power to the drive wheel 2 via an output power transmission mechanism 11 (e.g., a chain or a belt). The input shaft 6 is coupled to the output shaft 7 via a plurality of gear trains 8 having different reduction gear ratios so that power can be transmitted from the input shaft 6 to the output shaft 7. The input-side gears of the gear trains 8 are fixed to the input shaft 6. The output-side gears of the gear trains 8 are provided coaxially with the output shaft 7 and are rotatably fitted on the output shaft 7. The input-side gears and the output-side gears are constantly in mesh.

The transmission 5 includes a manual gear shifting power transmission mechanism 9 that is mechanically associated with manual operations by the driver and that selects one of the plurality of gear trains 8 to switch the power transmission route from one to another and accomplish gear shifting. The manual gear shifting power transmission mechanism 9 selects one power transmission route from among a neutral position and a plurality of gear positions (e.g., first to sixth gear positions). The manual gear shifting power transmission mechanism 9 includes: dog rings 15 that are slidably mounted on the output shaft 7 and that each engage with a selected one of the plurality of gear trains 8; shift forks 18 (not illustrated) that control engagement/disengagement of the dog rings 15; and a shift drum 10 that actuates the shift forks 18.

Upon the shift drum 10 being rotated in conjunction with an operation of a shift operation member (not illustrated) by the driver, a desired one of the shift forks 18 causes the corresponding dog ring 15 to slide along the output shaft 7 and engage with one of the gear trains 8 that has a reduction gear ratio desired by the driver. Thus, a power transmission route with a desired gear position is selected. The shift operation member is, for example, a shift pedal operated by a foot of the driver. The shift operation member (not illustrated) and the shift drum 10 are coupled to each other by a link member that acts in conjunction with the movement of the shift operation member to cause an angular movement of the shift drum 10. Thus, power applied manually to cause an angular movement of the shift operation member is transmitted to the shift drum 10, and the shift drum 10 is angularly moved.

The outer circumference of the shift drum 10 has grooves in which the shift forks 18 are fitted. Each groove has a portion whose location in the axial direction of the shift drum 10 varies along the circumferential direction of the shift drum 10. The shift fork 18 fitted in the groove of the shift drum 10 is prevented from corotating with the shift drum 10 and is supported by the output shaft 7 to be movable in the axial direction of the shift drum 10. Thus, the shift fork 18 moves in the axial direction according to the axial location of the groove engaged with the shift fork 18.

The shift forks 18 are coupled to the dog rings 15 and move the dog rings 15 in the axial direction. Upon one movement of the dog rings 15, a first power transmission route of the plurality of power transmission routes of the transmission 5 is brought into an engaged state, and power is transmitted from the input shaft 6 to the output shaft 7 at a first predetermined gear ratio. Upon another movement of the dog rings 15, a second power transmission route of the plurality of power transmission routes of the transmission 5 is brought into an engaged state, and power is transmitted from the input shaft 6 to the output shaft 7 at a second predetermined gear ratio. Between the time when the engaged state of the first power transmission route is resolved and the time when the engaged state of the second power transmission route is established, no power is transmitted from the input shaft 6 to the output shaft 7.

The dog rings 15 are embodied by dog rings 15 provided on one of the input and output shafts 6 and 7 (e.g., on the output shaft 7). In this case, the gear trains 8 supported by the shafts 6 and 7 are kept from moving in the axial direction. The dog rings 15, which are provided separately from the gear trains 8, are moved by the shift forks 18 in the axial direction and are engaged selectively with the gear trains 8, so that the power transmission state is switched from one to another.

The transmission 5 of the present embodiment has a neutral position where the shift drum 10 is kept stopped, and the neutral position is set as a position where the dog rings 15 are so arranged that no power is transmitted from the input shaft 6 to the output shaft 7 in a natural state where no power is applied by the driver. The driver can achieve non-transmission of power in the natural state by using the transmission 5, in particular by rotating the shift drum 10 to the neutral position provided in addition to the other gear positions.

The engine E includes a crankshaft 12 connected to the input shaft 6 of the transmission 5 via a first power transmission mechanism 13 (e.g., a gear) and a clutch 14 (e.g., a multi-plate clutch) so that power can be transmitted from the crankshaft 12 to the input shaft 6. That is, the clutch 14 is disposed in a first power transmission route R1 between the engine E and the input shaft 6. The clutch operation member 4 is, for example, a clutch lever operated by a hand of the driver or a clutch pedal. Once the clutch operation member 4 is moved to an operative position, the operation force applied by the driver is transmitted from a master cylinder 16 to a slave cylinder 17, from which the force is delivered as clutch actuation power to the clutch 14 via a rod inserted in the input shaft 6. As a result, the clutch 14 is brought into a disconnection state. When the clutch operation member 4 is in an inoperative position, no clutch actuation power is delivered to the clutch 14, or clutch actuation power is delivered to the clutch 14 through control of a hydraulic pressure switching unit 21 described later and, as a result, the clutch 14 is brought into a connection state. The handle is provided with a clutch operation sensor 49 that detects whether the clutch operation member 4 is in an operative state or inoperative state.

The electric motor M can generate power from electricity supplied from a battery 22 via an inverter 23, and also generate electricity from power transmitted from the input shaft 6 of the transmission 5 to charge the battery 22 with the generated electricity. The electric motor M is connected to the input shaft 6 of the transmission 5 via a second power transmission mechanism 19 (e.g., a gear). That is, the electric motor M is connected to the input shaft 6 through a second power transmission route R2 different from the first power transmission route 13. The second power transmission route R2 allows the state of connection between the electric motor M and the input shaft 6 to be constantly kept in a power transmission state. That is, the input shaft 6 includes a first input portion to which power is inputted from the engine E via the clutch 14 and a second input portion to which power is inputted from the electric motor M directly or via an intermediate member. In the input shaft 6, the second input portion is formed at a different location from the first input portion.

In the present embodiment, the second input portion is provided at a different location from the gear trains 8 for gear shifting. Providing the second input portion separately from the gear trains 8 allows the mounting location of the electric motor M to remain the same when the gear trains 8 for gear shifting are changed. Additionally, since a gear pair separate from the gear trains 8 for gear shifting can be dedicated for power transmission of the electric motor M, it is easy to transmit power of the electric motor M to the input shaft 6 by using a gear ratio and gear geometry suitable for power transmission of the electric motor M.

In the present embodiment, the first input portion is provided at one end of the input shaft 6. The second input portion is provided at the other end of the input shaft 6, the other end being opposite from the clutch 14. Thus, the electric motor M can be disposed without interference with the clutch 14 and first power transmission mechanism 13. Additionally, when both the engine E and the electric motor M are used to transmit power to the input shaft 6, torsion of the input shaft 6 about its axis can be reduced.

The crankshaft 12 of the engine E is equipped with an engine rotational speed sensor 24 (e.g., a crank angle sensor) capable of detecting the rotational speed of the crankshaft 12. The clutch 14 is equipped with a clutch sensor 25 (e.g., a stroke sensor) capable of detecting whether the clutch 14 is in a disconnection state or a connection state. The transmission 5 is equipped with a transmission sensor 26 capable of detecting the shift position of the manual gear shifting power transmission mechanism 9 (one position selected from the neutral position and the plurality of gear positions [e.g., first to sixth gear positions]) to detect a command given by the driver to shift the transmission 5. For example, the transmission sensor 26 is a potentiometer capable of detecting the rotation angle of the shift drum 10 or a gear position sensor. The drive wheel 2 is equipped with a drive wheel rotational speed sensor 27 that detects the rotational speed of the drive wheel 2.

The vehicle 1 is equipped with a controller 20. The controller 20 receives output signals from the engine rotational speed sensor 24, the clutch sensor 25, the transmission sensor 26, the drive wheel rotational speed sensor 27, and the clutch operation sensor 49. The controller 20 controls the engine E, the electric motor M, and the hydraulic pressure switching unit 21. The controller 20 includes an engine ECU 46 that controls the engine E, a motor ECU 47 that controls the electric motor M, and a hydraulic pressure ECU 48 that controls the hydraulic pressure switching unit 21. The controller 20 does not need to be constituted by the ECUs 46 to 47 separate from one another and may be configured as a single unit.

The controller 20 includes a processor, a volatile memory, a non-volatile memory, and an I/O interface. The processor receives information from various sensors including the engine rotational speed sensor 24, clutch sensor 25, transmission sensor 26, and drive wheel rotational speed sensor 27 through the I/O interface. The processor refers to the received information and performs processing using the volatile memory according to a program stored in the non-volatile memory, thereby controlling the engine E, the electric motor M, and the hydraulic pressure switching unit 21.

The engine ECU 46 controls the output of the engine E. For example, the engine ECU 46 controls an electronic throttle valve 42 for adjusting the amount of intake air introduced into the engine E. The engine ECU 46 informs the electronic throttle valve 42 of the target amount of intake air to adjust the output of the engine E. Additionally, the engine ECU 46 may control the ignition timing of an ignition plug 43 or the amount of fuel injected from a fuel injector 44 in order to adjust the output of the engine E.

The motor ECU 47 receives information such as the remaining charge or the voltage of the battery 22 from a battery management unit 45 responsible for management of the battery 22, and gives a command to the inverter 23 to control the operation of the electric motor M.

Figure 2:
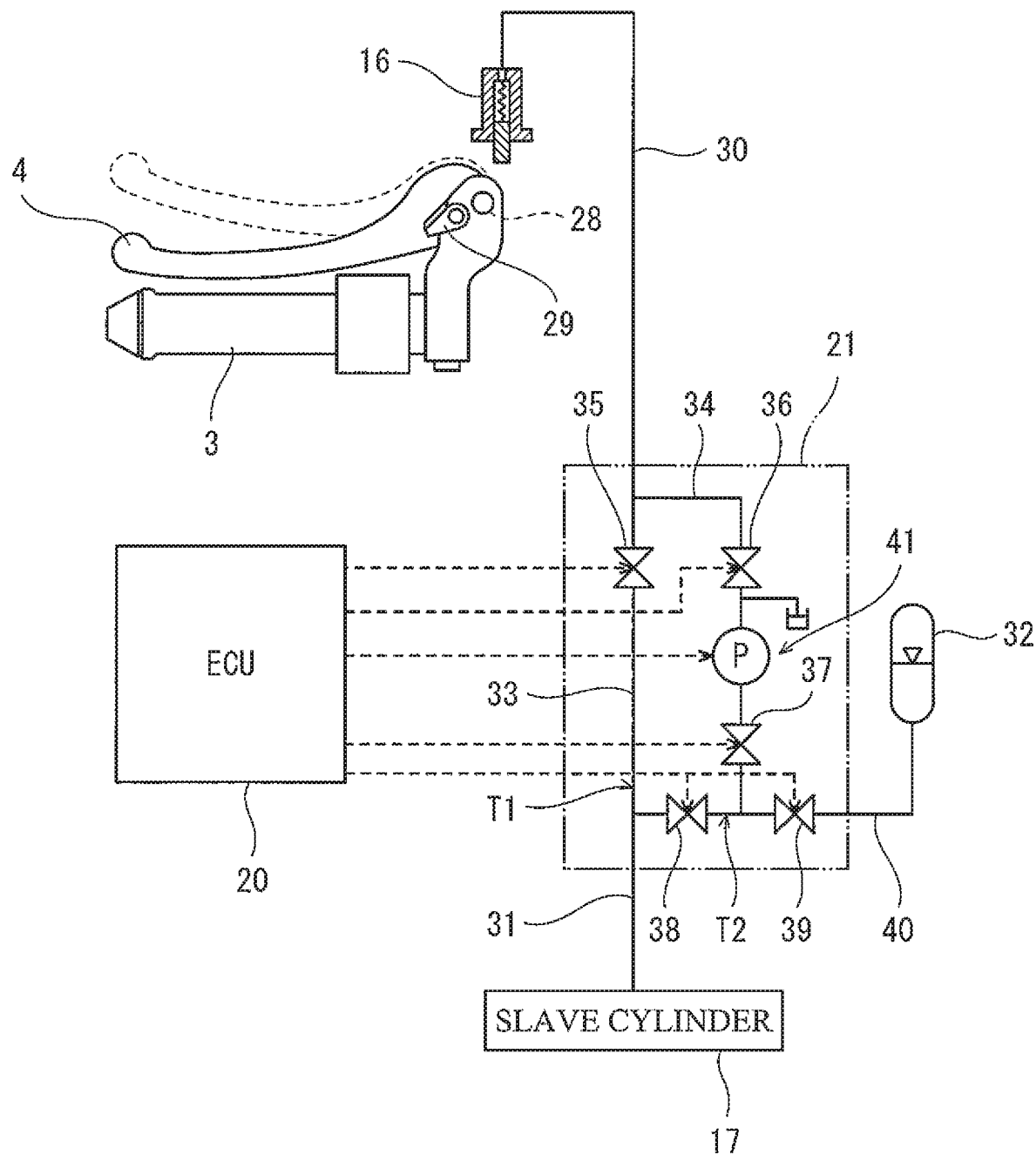
FIG. 2 is a circuit diagram including a hydraulic pressure switching unit of the vehicle of FIG. 1.

FIG. 2 is a circuit diagram including the hydraulic pressure switching unit 21 of the vehicle 1 of FIG. 1. As shown in FIG. 2, the vehicle 1 includes: a manual clutch actuation power transmission mechanism T1 that delivers an operation force of the driver as clutch actuation power to the clutch 14; and a controlled clutch actuation power transmission mechanism T2 that delivers power of a clutch actuator 41 as clutch actuation power to the clutch 14. The manual clutch actuation power transmission mechanism T1 and the controlled clutch actuation power transmission mechanism T2 are configured so that switching between the mechanisms can be made by the hydraulic pressure switching unit 21 controlled by the controller 20.

The clutch operation member 4 is provided with a biasing member 28 that biases the clutch operation member 4 from the operative position toward the inoperative position and a holding mechanism 29 configured to hold the clutch operation member 4 in the operative position. The biasing member 28 is, for example, a spring provided on a pivoting portion of the clutch operation member 4. The holding mechanism 29 is operable between a locking position and an unlocking position. Upon entering the locking position while the clutch operation member 4 is in the operative position, the holding mechanism 29 locks the clutch operation member 4 and holds the clutch operation member 4 in the operative position against the biasing member 28 without the need for the driver to operate the clutch operation member 4. Once the clutch operation member 4 enters the unlocking position, the clutch operation member 4 held in the operative position is returned to the inoperative position by the biasing member 28. For example, when the clutch operation member 4 is a clutch lever, the holding mechanism 29 may be a claw member fittable in a groove 4a of the clutch lever 4 in the operative state to lock the clutch lever 4. Once the claw member is engaged with the clutch operation member 4, the clutch lever 4 is maintained in the operative state.

In the vicinity of the clutch operation member 4 there is connected a master cylinder 16 mechanically associated with the movement of the clutch operation member 4. The master cylinder 16 receives a pressure mechanically delivered due to an operation force applied to move the clutch operation member 4 from the inoperative position to the operative position. The pressure delivered to the master cylinder 16 is transmitted to the hydraulic pressure switching unit 21 through a first hydraulic pressure pipe 30. A hydraulic pressure outputted from the hydraulic pressure switching unit 21 is delivered to the slave cylinder 17 through a second hydraulic pressure pipe 31. To the hydraulic pressure switching unit 21 is connected an accumulator 32.

The hydraulic pressure switching unit 21 includes a first hydraulic pressure passage 33 and a second hydraulic pressure passage 34 connected in parallel, and the first hydraulic pressure passage 33 and second hydraulic pressure passage 34 connect the first hydraulic pressure pipe 30 to the second hydraulic pressure pipe 31. In the first hydraulic pressure passage 33 is provided a first on-off valve 35. In the second hydraulic pressure passage 34 is provided a hydraulic pressure pump P. In the second hydraulic pressure passage 34 is also provided a second on-off valve 36, which is located upstream of the hydraulic pressure pump P. To the second hydraulic pressure passage 34 is connected a third hydraulic pressure passage 40, and the connection is made downstream of the second on-off valve 36. The third hydraulic pressure passage 40 is connected to the accumulator 32. In the second hydraulic pressure passage 34 are further provided a third on-off valve 37 and a fourth on-off valve 38, the third on-off valve 37 being located between the point of connection to the third hydraulic pressure passage 40 and the hydraulic pressure pump P, the fourth on-off valve 38 being located downstream of the point of connection to the third hydraulic pressure passage 40. The clutch actuator 41 is constituted by the on-off valves 36 to 39, the hydraulic pressure pump P, and the accumulator 32. A pressure reducing valve 39 is provided in the third hydraulic pressure passage 40.

Upon determining that the driver has performed a start-up operation such as an ignition operation, the controller 20 puts the hydraulic pressure pump P into operation to increase the hydraulic pressure in the hydraulic pressure passages including the accumulator 32. When it is determined, based on a detection value obtained by a hydraulic pressure sensor (not illustrated), that the hydraulic pressure of the accumulator 32 has reached a predetermine level, the controller 20 stops the operation of the hydraulic pressure pump P. The controller 20 may be configured to, once the hydraulic pressure reaches the predetermined level, determine that the vehicle is in an operable state and permit the vehicle to start traveling.

The controller 20 causes the first on-off valve 35 to open and the second and fourth on-off valves 36 and 38 to be closed in order to perform switching to the manual clutch actuation power transmission mechanism T1 that allows a hydraulic pressure to be transmitted directly from the master cylinder 16 to the slave cylinder 17. The controller 20 causes the accumulator 32 to accumulate pressure by putting the hydraulic pressure pump P into operation while the second and fourth on-off valves 36 and 38 are closed with the third on-off valve 37 being open. The controller 20 causes the first on-off valve 35 to be closed and the second on-off valve 36 to open in order to perform switching to the controlled clutch actuation power transmission mechanism T2.

By causing the third on-off valve 37 to be closed and the fourth on-off valve 38 to open when the switching to the controlled clutch actuation power transmission mechanism T2 has been made, the controller 20 allows the hydraulic pressure accumulated in the accumulator 32 to be transmitted to the slave cylinder 17, thereby bringing the clutch 14 into a disconnection state. In order to maintain the clutch 14 in the disconnection state when the switching to the controlled clutch actuation power transmission mechanism T2 has been made, the controller 20 causes the fourth on-off valve 38 to be closed. In order to bring the clutch 14 into a connection state when the switching to the controlled clutch actuation power transmission mechanism T2 has been made, the controller 20 causes the fourth on-off valve 38 and the pressure reducing valve 39 to open and thereby reduces the pressure delivered to the slave cylinder 17. When the on-off valves 35, 36, and 39 are closed and the on-off valves 37 and 38 are opened, the pressure can be directly delivered from the hydraulic pressure pump P to the slave cylinder 17.

FIGS. 3A to 3D are diagrams illustrating the power transmission state of the vehicle 1 of FIG. 1 in different modes. FIG. 4 is a table illustrating the respective states of the transmission 5, clutch 14, engine E, and electric motor M of the vehicle 1 of FIG. 1 in different modes. As shown in FIGS. 3 and 4, the control mode of the vehicle 1 includes an engine-motor-driven travel mode, an engine-driven travel mode, an electricity generation mode, and a motor-driven travel mode. Selection from among the modes is made by the program of the controller 20 or by the user.

In the engine-motor-driven travel mode, as shown in FIG. 3A and FIG. 4, the transmission 5 is in an engaged state (non-neutral state where the transmission is in any of the first to sixth gear positions), the clutch 14 is in an engaged state (connection), the engine E is in an operating state, and the electric motor M is in an operating state. The input shaft 6 receives power transmitted both from the engine E and from the electric motor M, and the power is transmitted to the drive wheel 2. That is, the controller 20 determines that the engaged state of the transmission 5 has been detected by the transmission sensor 26 and the engaged state of the clutch 14 has been detected by the clutch sensor 25, and puts the engine E and the electric motor M into operation to allow the vehicle to travel using power of both the engine E and the electric motor M.

In the engine-driven travel mode, as shown in FIG. 3B and FIG. 4, the transmission 5 is in an engaged state, the clutch 14 is in an engaged state, the engine E is in an operating state, and the electric motor M is in a free run state. The "free run state" refers to a state where the motor circuit is opened so as not to cause resistance due to generation of electromotive force when any power is transmitted to the electric motor M. That is, the controller 20 determines that the engaged state of the transmission 5 has been detected by the transmission sensor 26 and the engaged state of the clutch 14 has been detected by the clutch sensor 25, causes the circuit of the electric motor M to open, and puts the engine E into operation to allow the vehicle to travel using power of the engine E alone.

In the electricity generation mode, as shown in FIG. 3C and FIG. 4, the transmission 5 is in a disengaged state (neutral state), the clutch 14 is in an engaged state, the engine E is in an operating state, and the electric motor M is in an electricity generating state. Upon satisfaction of a first electricity generation condition or a second electricity generation condition, the controller 20 causes the electric motor M to generate electricity from power transmitted from the engine E via the input shaft 6, thereby charging the battery 22.

The first electricity generation condition is that the electricity generation mode has been selected by the program of the controller 20 or by the user and the disengaged state of the transmission 5 has been detected by the transmission sensor 26. Upon satisfaction of the first electricity generation condition, the controller 20 causes the hydraulic pressure switching unit 21 to switch to the controlled clutch actuation power transmission mechanism T2 and causes the clutch actuator 41 to bring the clutch 14 into the engaged state (connection state), thereby allowing the electric motor M to generate electricity from power transmitted from the engine E via the input shaft 6 and charging the battery 22.

The second electricity generation condition is that the electricity generation mode has been selected by the program of the controller 20 or by the user, the engaged state of the transmission 5 has been detected by the transmission sensor 26, the switching of the hydraulic pressure switching unit 21 to the manual clutch actuation power transmission mechanism T1 has been detected by the controller 20, and the engaged state (connection state) of the clutch 14 has been detected by the clutch sensor 25 based on the clutch operation member 4 being in the inoperative position. Upon satisfaction of the second electricity generation condition, the controller 20 causes the electric motor M to generate electricity from power transmitted from the engine E via the input shaft 6, thereby charging the battery 22.

In the motor-driven travel mode, as shown in FIG. 3D and FIG. 4, the transmission 5 is in an engaged state, the clutch 14 is in a disengaged state (disconnection), the engine E is in a stopped state, and the electric motor M is in an operating state. Specifically, when the motor-driven travel mode has been selected by the program of the controller 20 or by the user, and the engaged state of the transmission 5 has been detected by the transmission sensor 26, and the disengaged state of the clutch 14 has been detected by the clutch sensor 25, the controller 20 puts the electric motor M into operation to allow the vehicle to travel using power of the electric motor M alone. The disengaged state of the clutch 14 may be established by causing the hydraulic pressure switching unit 21 to switch to the controlled clutch actuation power transmission mechanism T2 under control of the controller 20 and by using the hydraulic pressure of the clutch actuator 41 or may be established by holding the clutch operation member 4 in the operative position when the switching of the hydraulic pressure switching unit 21 to the manual clutch actuation power transmission mechanism T1 has been detected.

In the engine-motor-driven travel mode, the engine-driven travel mode, and the motor-driven travel mode, the inertial force of the drive wheel 2 is inputted to the electric motor M via the transmission 5 during deceleration of the vehicle 1. Thus, the controller 20 causes the electric motor M to perform regeneration to charge the battery 22 during deceleration of the vehicle 1.

In the engine-motor-driven travel mode and the motor-driven travel mode, the controller 20, upon detection of a gear shifting command by the transmission sensor 26, controls the electric motor M in such a manner that the difference in rotational speed between the input shaft 6 (input-side rotating member) and the output shaft 7 (output-side rotating member) becomes smaller than that occurring before the detection of the gear shifting command. The rotational speed of the input shaft 6 is determined by multiplying the rotational speed detected by the engine rotational speed sensor 24 by the reduction gear ratio of the first power transmission mechanism 13. The rotational speed of the output shaft 7 is determined by dividing the rotational speed detected by the drive wheel rotational speed sensor 27 by the reduction gear ratio of the second power transmission mechanism 19. That is, the difference in rotational speed between the input shaft 6 and the output shaft 7 is calculated from output signals from the engine rotational speed sensor 24 and the drive wheel rotational speed sensor 27.

Figure 5:
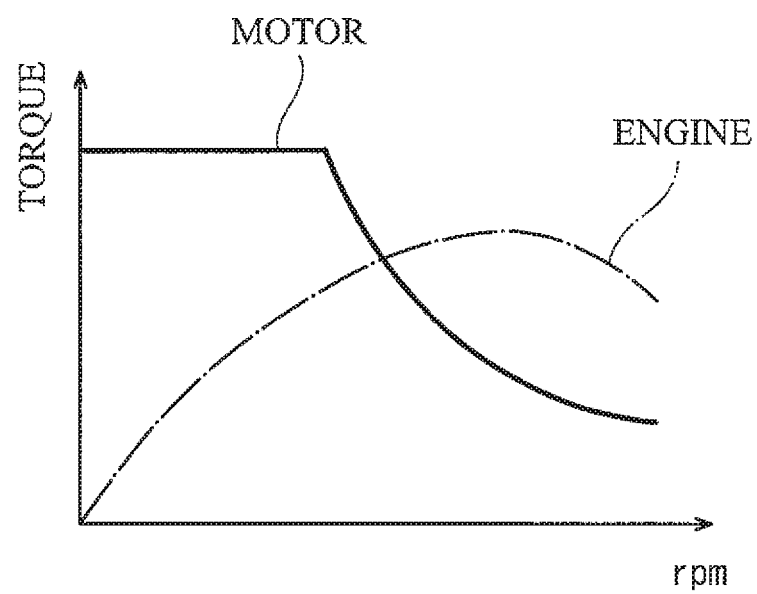
FIG. 5 is a graph showing the relationship between torque and rotational speed of the vehicle of FIG. 1 in an engine-motor-driven travel mode.

FIG. 5 is a graph showing the relationship between torque and rotational speed of the vehicle 1 of FIG. 1 in the engine-motor-driven travel mode. In the engine-motor-driven travel mode, as shown in FIG. 5, the controller 20 varies the torque distribution between the torque generated by the engine E and the torque generated by the electric motor M according to the rotational speed. Specifically, since the torque curve of the engine E depends on the engine design, the controller 20 regulates the torque generated by the electric motor M to adjust the torque distribution. The controller 20 controls the electric motor M so that a torque generated at a low rotational speed lower than a predetermined threshold is higher than a torque generated at a high rotational speed equal to or higher than the threshold.

Figure 6:
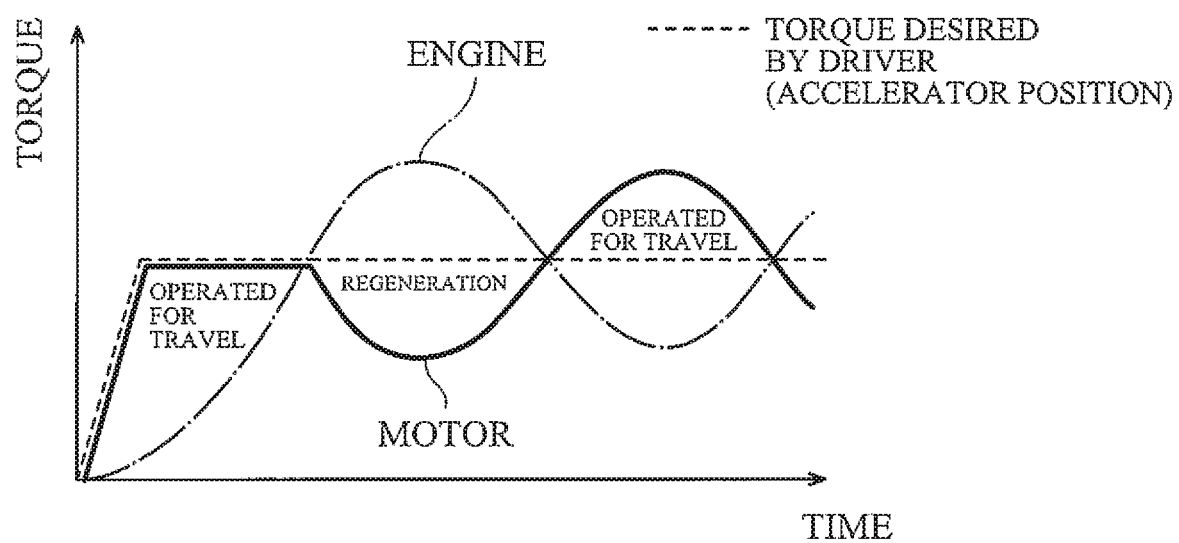
FIG. 6 is a graph showing the relationship between torque and time of the vehicle of FIG. 1 in the engine-motor-driven travel mode.

FIG. 6 is a graph showing the relationship between torque and time of the vehicle 1 of FIG. 1 in the engine-motor-driven travel mode. Since the torque generated by the engine E varies sinusoidally with time as shown in FIG. 6, there occurs a deviation from a torque desired by the driver (e.g., accelerator position). When the torque generated by the engine E is lower than the torque desired by the driver, the controller 20 puts the electric motor M into operation and controls the electric motor M so that the total of the torque generated by the engine E and the torque generated by the electric motor M comes close to the torque desired by the driver. When the torque generated by the engine E is higher than the torque desired by the driver, the controller 20 causes the electric motor M to perform regeneration and controls the electric motor M so that the total of the torque generated by the engine E and the regenerative torque of the electric motor M comes close to the torque desired by the driver.

With the configuration described above, when the vehicle is allowed to travel using the electric motor M alone in a state where the power transmission route between the engine E and the transmission 5 is broken by the clutch 14, drive power can be transmitted from the electric motor M to the drive wheel 2 along with prevention of power transmission from the electric motor M to the crankshaft 12. Thus, pumping loss can be prevented to reduce the energy loss when the drive wheel 2 is driven by the electric motor M alone.

When the transmission 5 is shifted from one gear ratio to another while the engine E is in operation and the drive wheel 2 is rotating, the clutch 14 can be used to switch the state of power transmission between the engine E and the transmission 5. Thus, during the gear shifting, an abrupt change of the difference in rotational speed between the engine E-side rotating member and the drive wheel 2-side rotating member can be prevented, and hence gear shifting shock can be reduced. That is, both the function of reducing gear shifting shock and the function of allowing transmission of drive power from the electric motor M alone can be served by one and the same clutch 14, and complication of the mechanism for power transmission switching can be prevented.

When the transmission 5 is in a disengaged state, the controller 20 causes the electric motor M to generate electricity from power transmitted from the engine E via the input shaft 6. Thus, it is possible to cause the electric motor M to perform electricity generation by making use of the neutral position of the transmission 5. Additionally, upon detection of a gear shifting command, the electric motor M is controlled in such a manner that the difference in rotational speed between the input shaft 6 and the output shaft 7 becomes smaller than that occurring before the detection of the gear shifting command. Thus, smooth gear shifting can be achieved even when power transmission from the electric motor M to the input shaft 6 is maintained.

Additionally, since the electric motor M is controlled based on output signals from the clutch sensor 25 and the transmission sensor 26, the control of the electric motor M can be accomplished according to the present state of the power transmission route or according to commands given by the driver concerning the power transmission state. Additionally, since the vehicle 1 includes the manual clutch actuation power transmission mechanism T1 that delivers an operation force of the driver as clutch actuation power to the clutch 14 and the controlled clutch actuation power transmission mechanism T2 that delivers power of the clutch actuator 41 as clutch actuation power to the clutch 14, the clutch actuation by a force of the driver and the clutch actuation by power of the actuator can be selectively used for disconnection/connection of the clutch 14. This makes it easy to achieve improved performance.

Additionally, since the clutch operation member 4 is provided with the holding mechanism 29 configured to hold the clutch operation member 4 against the biasing member 28, the clutch operation member 4 can be maintained in the operative position without the need for the driver to continue operating the clutch operation member 4. Additionally, the controller 20 is operable in a control mode in which the controller 20 causes the circuit of the electric motor M to open and brings the electric motor M into a free run state when the transmission 5 and the clutch 14 are in engaged states. Thus, a time period can be provided during which the vehicle is traveling by relying substantially only on the engine E.

In the embodiment described above, the engine E and the electric motor M are controlled on the assumption that the mode selection is made by a program or by the user. However, the present invention is not limited to this configuration. That is, the control of the engine E and the electric motor M may be performed by selecting a desired mode according to the switching of the power transmission route. Specifically, the controller 20 may execute the engine-motor-driven travel mode upon determining that the transmission 5 is in an engaged state and the clutch 14 is also in an engaged state.

Figure 7:
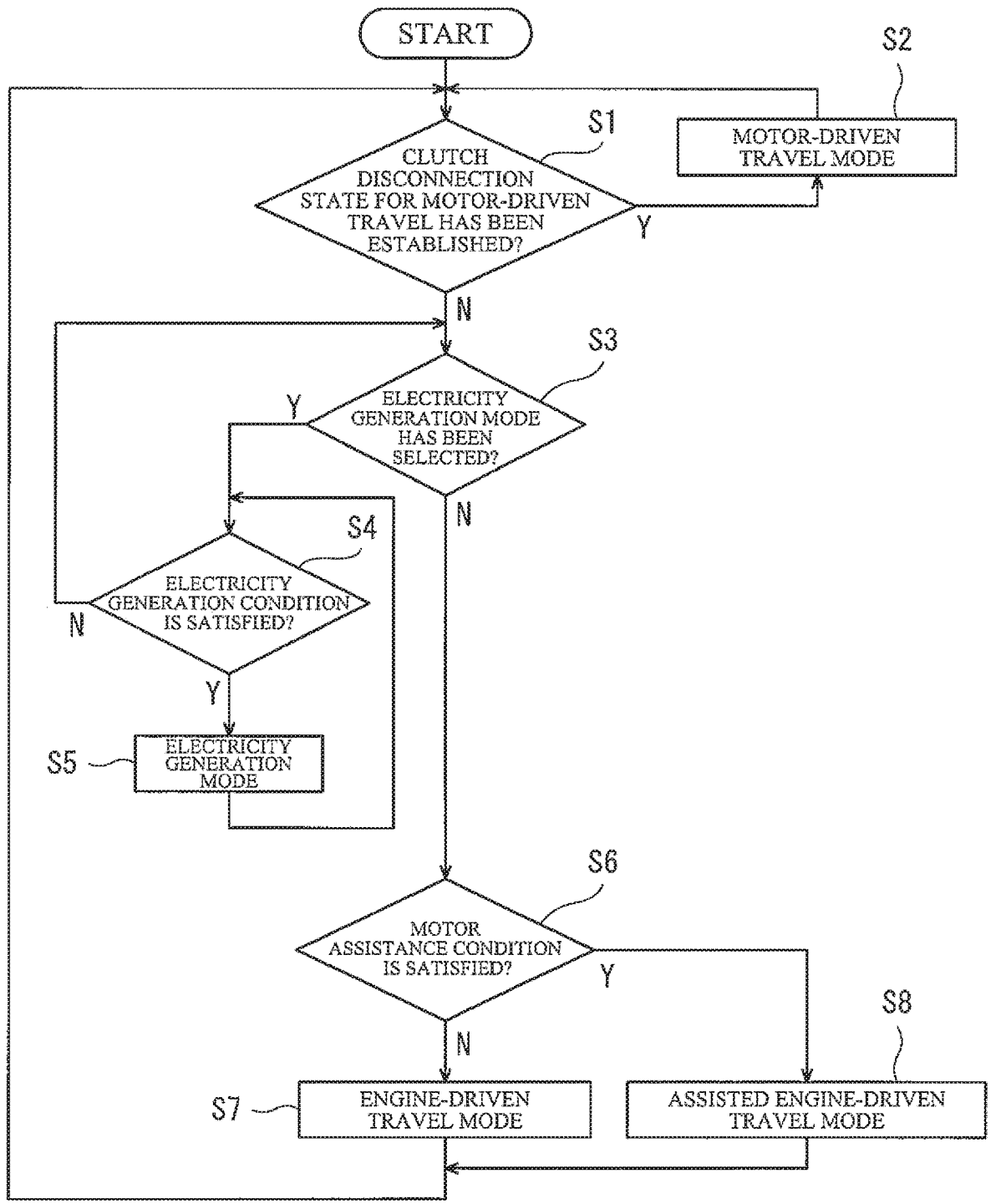
FIG. 7 is a flowchart illustrating a modified example of mode switching.

The manner of mode switching is not limited to those described above. For example, mode switching may be performed according to the flowchart shown in FIG. 7. As shown in FIG. 7, the controller 20 first determines whether or not the clutch 14 is in a connection state based on a disconnection operation command instructing the clutch actuator 41 to bring the clutch 14 into a disconnection state (step S1). Upon determining that the clutch 14 is in a disconnection state (step S1: YES), the controller 20 switches to the motor-driven travel mode (step S2). The switching of the controller 20 to the motor-driven travel mode is executed in response to a mode selection made by the driver and is executed also upon determining that the clutch hydraulic pressure has been at a level for clutch disconnection for a predetermined time. Thus, a clutch disconnection process for motor-driven travel is enabled independently of clutch actuation which takes place in response to an operation performed by the driver. Since the switching to the motor-driven travel mode takes place upon the clutch disconnection process for motor-driven travel, mode switching to the motor-driven travel mode from the engine-driven travel mode can be prevented from occurring in response to an operation of the clutch operation member 4 by the driver.

Upon determining that the clutch disconnection state for motor-driven travel has not been established by the clutch actuator 41 (step S2: NO), the controller 20 determines whether or not the electricity generation mode has been selected (step S3). Upon determining that the electricity generation mode has been selected (step S3: YES), the controller 20 determines whether or not the electricity generation condition is satisfied (step S4). Upon determining that the electricity generation condition is not satisfied (step S4: NO), the control flow returns to step S3. Upon determining that the electricity generation condition is satisfied (step S4: YES), the controller 20 executes the electricity generation mode (step S5). The selection of the electricity generation mode may be made through operations of a plurality of switches by the driver. In this case, switching to the electricity generation mode can be prevented from taking place upon an erroneous operation. For example, the selection of the electricity generation mode may be made by placing the key in an electricity generation mode setting position and at the same time operating an engine start switch.

The electricity generation condition includes at least the condition that the gear position of the transmission 5 should be the neutral position. Additionally, for example, the electricity generation condition may include the condition that the vehicle should be in a stopped state. In this case, undesired switching to the electricity generation mode can be prevented. For example, the vehicle may be determined to have stopped traveling based on a side stand switch or a detection signal obtained by a vehicle speed sensor. The electricity generation condition may include the condition that the remaining amount of fuel should be greater than a predetermined level. In this case, excessive decrease in the amount of fuel due to electricity generation can be prevented to ensure that the vehicle driven by the engine E can travel the minimum necessary distance. The electricity generation condition may include the condition that the remaining charge of the battery 22 should be lower than a predetermined level. In this case, the battery 22 can be prevented from being overcharged as a result of electricity generation.

During execution of the electricity generation mode, the amount of intake air introduced into the engine E is controlled by the electronic throttle valve. Thus, the driver can be freed from the need to control the amount of intake air during execution of the electricity generation mode and can enjoy improved convenience. In the electricity generation mode, the rotational speed of the engine E is kept in a rotational speed range over which the engine E exhibits high output efficiency or in a rotational speed range over which the electric motor M exhibits high electricity generation efficiency. This can increase the electricity generation efficiency. For example, since the speed change ratio between the electric motor M and the input shaft 6 may be adjusted as appropriate by a mechanism independent of the gear trains for gear shifting, the rotational speed of the engine E can easily be kept in a rotational speed range over which the engine E exhibits high output efficiency and at the same time the electric motor M exhibits high electricity generation efficiency. Additionally, an external device may be connected to the battery 22 and, when the external device determines that the remaining charge of the battery 22 is low, the engine E may be controlled to increase the engine rotational speed so as to increase the amount of electricity generated in the electricity generation mode. During execution of the electricity generation mode, operation commands given through a throttle grip or a brake lever may be disabled. This can prevent a situation where an operation performed by the driver causes the engine and motor to run in a manner unfavorable to electricity generation control. If the vehicle includes a brake pressure unit configured to adjust the brake pressure, it is preferable, during execution of the electricity generation mode, to control the brake pressure unit so that at least the rear wheel 3 is subjected to braking.

The electricity generation mode may be terminated upon detection of a preparatory action for travel, such as retraction of the side stand, sitting of the driver on the seat (which is detected by a pressure sensor or a suspension stroke sensor), placement of the vehicle body in an upright position (which is detected by a gyro sensor), or clutch operation, and subsequently engine stopping control may be executed. Additionally, clutch disconnection control may be executed until the engine E is stopped. The electricity generation condition may include the condition that a restriction member configured to restrict the rotation of the gear shifting operation member or shift drum should be held in a restricting position. In this case, rotation of the drive wheel 3 can be prevented during execution of the electricity generation mode.

Upon determining that the electricity generation condition is not satisfied (step S4: NO), the control flow returns to step S3. Upon determining that the clutch disconnection state for motor-driven travel has not been established (step S1: NO) and that the electricity generation mode has not been selected (step S3: NO), it is determined whether or not a motor assistance condition is satisfied (step S6). Upon determining that the motor assistance condition is not satisfied (step S6: NO), the engine output is controlled to achieve an output which is in accordance with the throttle operation (step S7). Upon determining that the motor assistance condition is satisfied (step S6: YES), motor output assistance control is executed in which the motor output is added to the engine output (step S8). In the motor output assistance control, the motor is controlled according to the assistance condition, and thus the influence of the motor output on the throttle operation is smaller than the influence of the engine output on the throttle operation.

When the motor-driven travel mode is executed upon determining that the clutch disconnection state for motor-driven travel has been established (step S1: YES), the motor output is controlled to achieve an output which is in accordance with the throttle operation. For example, the output change in response to the throttle operation by the driver in the motor-driven travel mode may be similar to the output change in response to the throttle operation by the driver in the engine-driven travel mode. This can reduce the influence of the difference between the travel modes on the feeling of the driver.

In the engine-driven travel mode, the electronic throttle valve may be controlled according to the throttle operation by the driver to increase or decrease the output of the engine E. Control of the electric motor M in the engine-motor-driven travel mode is different from control of the electric motor M in the motor-driven travel mode. In the engine-motor-driven travel mode, the drive power is not only derived from the engine output but can be adjusted by the electric motor M according to the assistance condition, and thus an output increase can be achieved when high drive power is required. For example, upon detection of an acceleration operation or a starting operation, the drive power can be increased by actuating the electric motor M. For example, when an acceleration operation is performed in a rotational speed range where the output torque of the engine is low due to the engine characteristics, the electric motor M may be controlled to provide enhanced output assistance. In particular, when the engine is in a low rotational speed range, such as at the time of the start of the vehicle, lack of the engine output torque during low-speed rotation can easily be compensated for by enhancing output assistance provided by the operation of the electric motor M. When the sinusoidal curve representing the torque of the engine E has a deep valley portion, namely when a rotational speed range exists where a torque increase by the engine is less expected than in other rotational speed ranges, the assistance from the electric motor M may be enhanced at the valley portion of the torque.

The electric motor M may be brought into a free run state when the output assistance from the electric motor M is unnecessary, such as during travel at a constant speed, during a gentle output-increasing operation, and during deceleration. This can reduce the resistance caused by the electric motor M when the assistance from the motor is unnecessary during the engine-motor-driven travel mode. The reduction gear ratios as speed change ratios may be set relatively low on the premise of the output assistance from the electric motor M. Such gear ratio setting can increase the maximum travel speed. A torque decrease arising from the low reduction gear ratios may be compensated for by the assistance from the electric motor M. The electric motor M may be controlled to reduce torsional vibration of the input shaft 6 by taking into consideration a situation where the torsional vibration of the input shaft 6 is likely to occur.

In the engine-motor-driven travel mode, regenerative control using the electric motor M may be performed according to the brake operation by the driver. This allows recovery of kinetic energy in the form of electricity, thus reducing the energy consumption. When the remaining charge of the battery 22 is equal to or less than a predetermined level, electricity generation control using the electric motor M may be performed during idling. In this case, engine control may be performed to make the idling rotational speed during the electricity generation control higher than the idling rotational speed during any control other than the electricity generation control. This can prevent stoppage of the engine E during the electricity generation control. When a rotational speed range where the electricity generation efficiency is high is set as a rotational speed range for electricity generation, the engine E may be controlled so that the idling rotational speed during electricity generation is used as a rotational speed for electricity generation.

In the engine-motor-driven travel mode, the electric motor M may, upon detection of a gear shifting operation, be controlled to achieve smooth disengagement of the dog rings 15. For example, when the gear shifting operation is performed during acceleration, the torque derived from the electric motor M is momentarily reduced or a regenerative torque is momentarily generated. When the gear shifting operation is performed during engine braking, the torque derived from the electric motor M is momentarily increased. This reduces power transmission through the dog ring 15 and enables easy sliding of the dog ring 15. Before the subsequent engagement of the dog ring 15 is made, namely while power transmission between the input shaft 6 and the output shaft 7 is disabled, the output of the electric motor M may be controlled to reduce the difference in rotational speed between the output shaft 7 and the input shaft 6. For example, when the rotational speed of the dog ring 15 (corotating with the output shaft) is higher than the rotational speed of an engagement member (corotating with the input shaft 6) with which the dog ring 15 is supposed to subsequently engage, the electric motor M is controlled to increase the rotational speed of the engagement member. When the rotational speed of the dog ring 15 is lower than that of the engagement member, the electric motor M is controlled to decrease the rotational speed of the engagement member. This can reduce the shock caused by engagement of the dog ring 15 during the gear shifting. Before the dog ring 15 makes the subsequent engagement with the engagement member, the electric motor M may be controlled to provide a torque opposite in direction to that given to the input shaft 6 from the engine E so that the magnitude of the total torque (positive or negative) imparted to the input shaft 6 is reduced. This can reduce the burden of the clutch operation, thus facilitating the gear shifting operation.

When a movement of the clutch 14 or an operation of the shift operation member 4 is detected, it may be determined that a gear shifting operation has been performed. Upon an increase in engine rotational speed or vehicle speed, it may be determined that the vehicle is accelerating. Upon a decrease in engine rotational speed or vehicle velocity, it may be determined that the vehicle is decelerating.

The engine-driven travel mode may be executed when the controller 20 determines that the remaining charge of the battery 22 is equal to or less than a predetermined level. In the engine-driven travel mode, the electric motor M may be brought into a free run state. The regenerative control using the electric motor M may be performed during braking. Further, in the engine-driven travel mode, the regenerative control may be performed during non-braking periods. This makes it easy to restore the decreased remaining charge of the battery 22.

When a clutch operation is performed during the motor-driven travel mode, the electric motor M is brought into a free run state instead of switching the state of power transmission between the clutch 14 and the engine E, and thus a quasi-power transmission-disabled state can be established in which no power is transmitted from the electric motor M to the input shaft 6. This can reduce the influence of the difference between the travel modes on the handling feeling of the driver. In the motor-driven travel mode, gear shifting control different from that in the engine-driven travel mode is executed. Specifically, when a gear shifting operation is performed, the electric motor M is brought into a free run state to facilitate disengagement of the dog rings 15 of the transmission 5. This allows smooth gear shifting without the need for disposing a clutch in the power transmission route between the electric motor M and the input shaft 6. During the disengagement of the dog rings 15, the electric motor M may be caused to generate a counter torque or perform rotational speed adjustment in order to additionally execute gear shifting assistance control similar to that in the engine-driven travel mode.

When, in the engine-driven travel mode, control for adjusting the output of the engine E is performed for the purpose of slip prevention control or for any other purpose, similar output adjustment may be performed in the motor-driven travel mode by controlling the motor.

It is only necessary that engine-driven travel and motor-driven travel be possible, and the electricity generation mode need not necessarily be provided. The regenerative control need not necessarily be performed. The clutch actuator 41 need not necessarily be provided, and the power for actuating the clutch 14 may be imparted by the driver. The power transmission to the clutch 14 may be achieved by means of a wire rather than by means of a hydraulic pressure.

Instead of a manual clutch, an electrically-actuated clutch may be provided to enable a shifting process to be induced by an actuator according to a gear shifting command given by the driver. A gear shifting process performed upon a gear shifting operation may also be induced by the actuator. When a command to switch to the motor-driven travel mode is given by the driver, the actuator may be controlled to maintain a clutch disconnection state while the motor-driven travel mode is executed.

Instead of the transmission 5 which is of the type configured to move the dog rings 15 (the gears are unmovable in the axial direction), another type of transmission may be used in which the gears are moved by a shifter in the axial direction to accomplish gear shifting. The gear shifting engagement members of the transmission may be embodied by dog gears provided on the input shaft 6 and on the output shaft 7. When the engagement members are configured as dog gears, one gear of a gear pair selected to be involved in power transmission is moved by a shift fork, and thus the gears of the selected gear pair mesh with each other, so that the power transmission state is switched.

Figure 8:
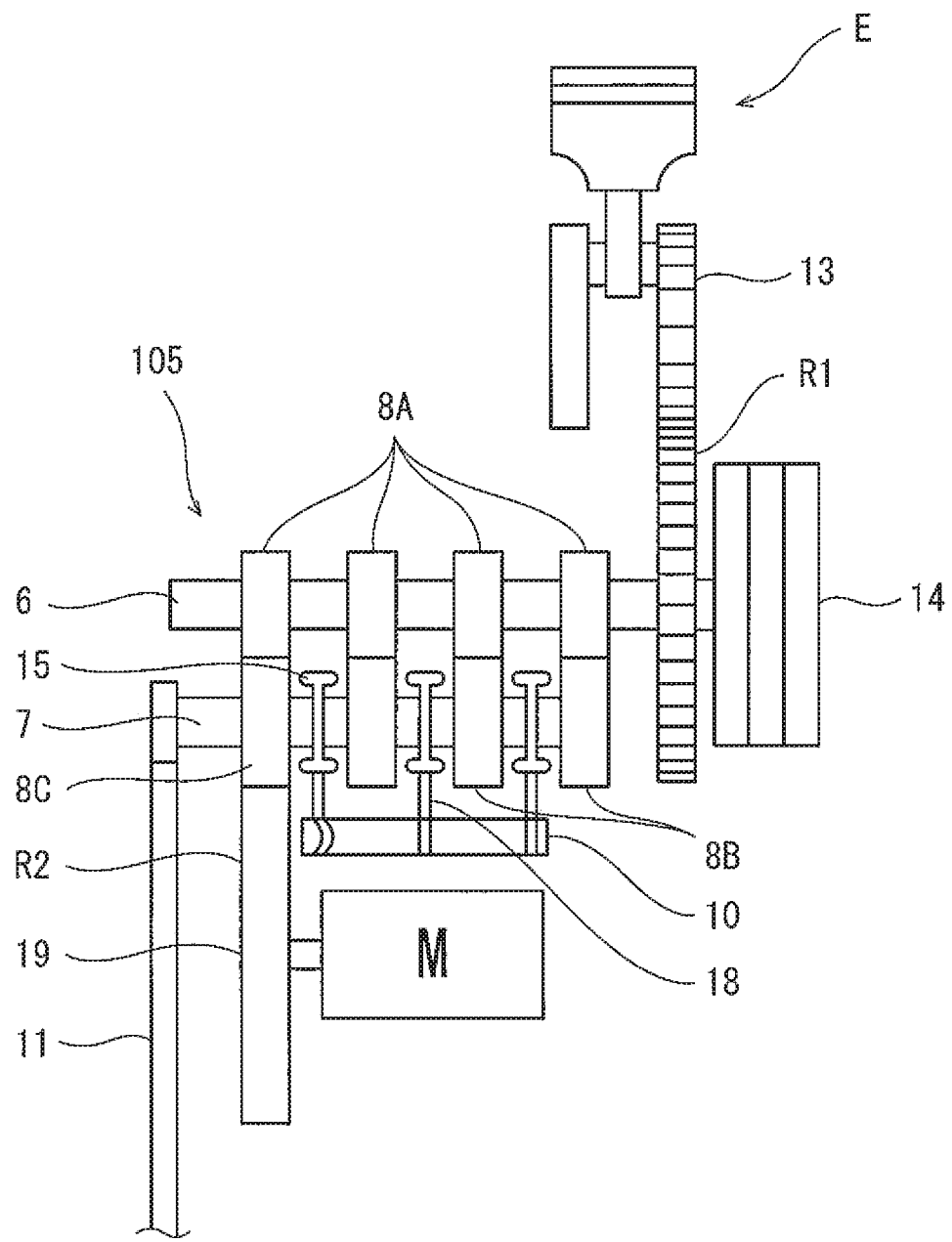
FIG. 8 is a block diagram showing a modified example of the manner of connection of an electric motor.

FIG. 8 is a block diagram showing a modified example of the manner of connection of the electric motor M. In a transmission 105 shown in FIG. 8, gears 8A provided on the input shaft 6 are fitted on the input shaft 6 so as to corotate with the input shaft 6, while gears 8B and 8C provided on the output shaft 7 are rotatably fitted on the output shaft 7 so as to rotate independently of the output shaft 7. The gears 8B and 8C provided on the output shaft 7 are constantly in mesh with the gears 8A provided on the input shaft 6. The dog rings 15 provided on the output shaft 7 are fitted on the output shaft 7 so as to corotate with the output shaft 7. Upon rotation of the shift drum 10, the shift fork 18 moves along the output shaft 7 to cause the dog ring 15 to engage with one gear selected from the plurality of gears 8B and 8C, and the engaged gear corotates with the output shaft 7.

The electric motor M is connected to the gear 8C which is one of the gears 8B provided on the output shaft 7 via the second power transmission mechanism R2, so that power is constantly transmitted from the electric motor M to the gear 8C. When the dog ring 15 is not engaged with the gear 8C, the gear 8C rotates independently of the output shaft 7. Thus, power of the electric motor M is transmitted to the input shaft 6 via the gear 8C and gear 8A, and the resulting rotation of the input shaft 6 is transmitted to the output shaft 7 via the gear 8B corresponding to the desired gear position and engaged with the dog ring 15. That is, with the configuration of FIG. 8, the electric motor M can transmit power to the input shaft 6 through a route different from the route through which power from the engine E is transmitted to the input shaft 6. When the dog ring 15 is engaged with the gear 8C, the gear 8C corotates with the output shaft 7. Thus, power transmitted from the electric motor M to the gear 8C can be directly transmitted to the output shaft 7.

A controlled gear shifting power transmission mechanism that delivers power of an actuator as gear shifting power to the transmission 5 may be provided in addition to the manual gear shifting power transmission mechanism 9 that delivers an operation force of the driver as gear shifting power to the transmission 5. In this case, when the remaining charge of the battery 22 is determined to be equal to or less than a predetermined level based on an output signal from a battery remaining charge detection sensor, the controlled gear shifting power transmission mechanism may be operated to bring the transmission 5 into an engaged state while the controlled clutch actuation power transmission mechanism is operated to bring the clutch 14 into an engaged state, and the electric motor M may be caused to generate electricity from power transmitted to the electric motor M from the engine E or drive wheel 2 via the input shaft 6 in order to charge the battery 22.

The transmission sensor 26 may be a sensor that detects the motion of the shift operation member (gear shifting operation command). The clutch sensor 25 may be a sensor that detects the motion of the clutch operation member 4 (clutch actuation command). The clutch actuator 41 may be configured to apply pressure to the slave cylinder 17 directly by means of power of the hydraulic pressure pump P without the use of the accumulator 32.

The hydraulic pressure pump P is not limited to being electrically actuated and may be actuated by means of power of the engine E or electric motor M. For example, the engine E may be placed in a position where the cylinder head of the engine E faces forward and upward, and the hydraulic pressure pump P may be actuated by extracting power from a valve actuating mechanism disposed inside the cylinder head. In this case, the engine E may have an exhaust port located forward of an air-intake port in the vehicle, and power may be extracted from a cam or camshaft responsible for actuation of an exhaust valve in order to achieve improved space efficiency. The shift operation member may be a shift lever operated by a hand of the driver. The clutch operation member 4 may be a clutch pedal operated by a foot of the driver.

Figure 9:
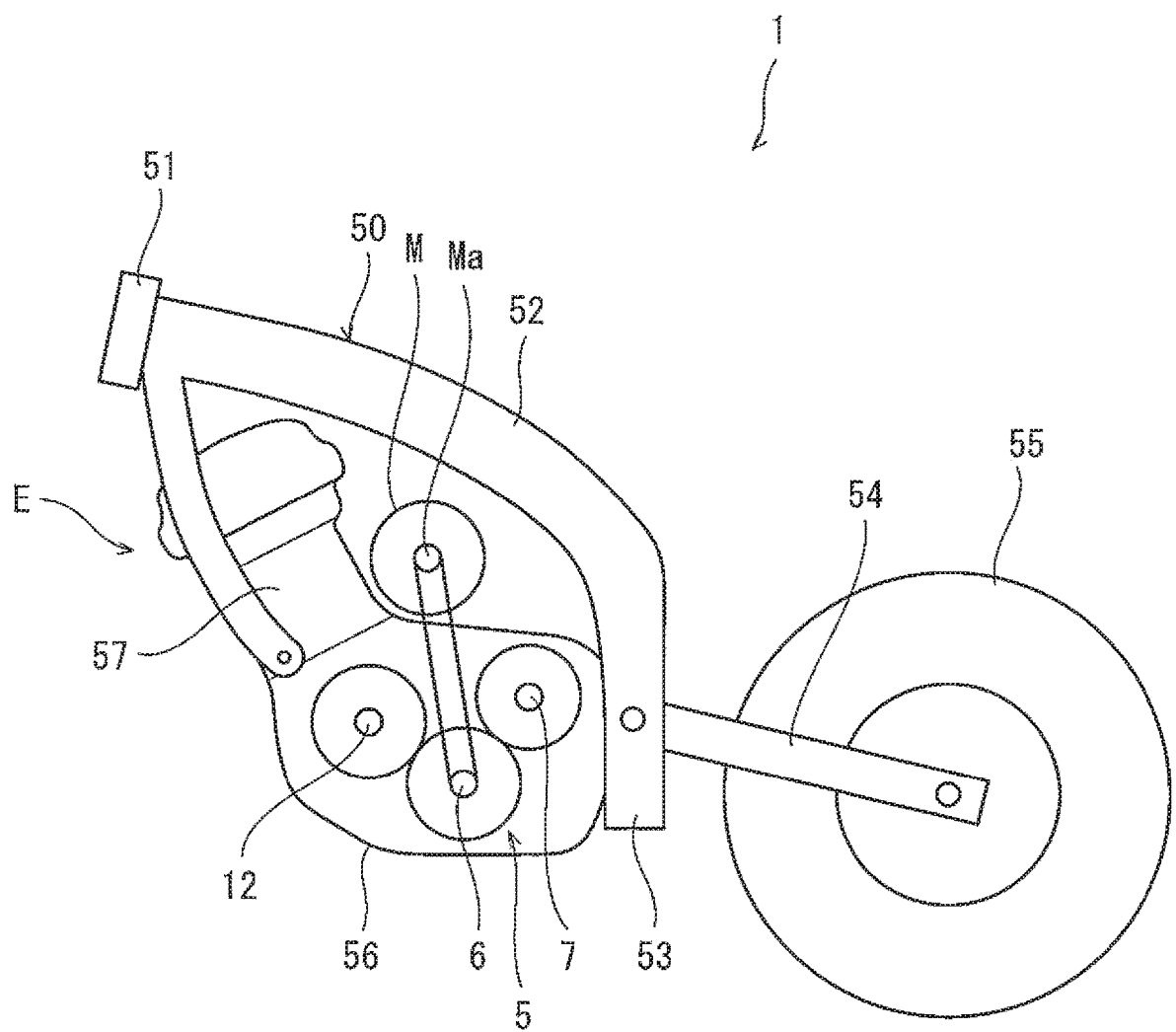
FIG. 9 is a side view showing an example where an electric motor is installed in a hybrid vehicle configured as a motorcycle.

FIG. 9 is a side view showing an example in which the electric motor M is installed in the hybrid vehicle 1 configured as a motorcycle. As shown in FIG. 1, the motorcycle 1 includes a vehicle body frame 50. The vehicle body frame 50 includes: a head pipe 51 that rotatably supports a steering shaft coupled to a handlebar; a main frame 52 extending obliquely downward in the rearward direction from the head pipe 51; and a pivot frame 53 coupled to a rear of the main frame 52. A front of a swing arm 54 is pivotally supported by the pivot frame 53, and a rear wheel 55 serving as the drive wheel is rotatably supported by a rear of the swing arm 54.

The engine E is supported by the main frame 52 and the pivot frame 53. The engine E includes a crankcase 56 housing the crankshaft 12 of the engine E and a cylinder 57 connected to an upper portion of the crankcase 56. In side view, the engine E is approximately in an L-shape defined by the crankcase 56 extending in the forward/rearward direction and the cylinder 57 projecting upward from the front of the crankcase 56. The crankcase 56 houses the transmission 5, which is located rearward of the crankshaft 12.

The electric motor M is disposed in a space located rearward of the cylinder 57 and above the crankcase 56. In other words, the electric motor M is disposed in a space defined by the rear surface of the cylinder 57 and the upper surface of the crankcase 56. The electric motor M has a drive shaft Ma disposed rearward of the crankshaft 12 and forward of the output shaft 7 of the transmission 5. The drive shaft Ma of the electric motor M is configured to input power to the input shaft 6 of the transmission 5. Specifically, the drive shaft Ma of the electric motor M is connected to the input shaft 6 of the transmission 5 on one side in the vehicle width direction (on the left side in FIG. 9), and the connection is made via a gear, belt, or chain so that power can be transmitted to the input shaft 6. The electric motor M may be supported by the main frame 52, the crankcase 56, or the cylinder 57. A gap may be provided between the electric motor M and the cylinder block 57. With this configuration, the electric motor M can be disposed close to the input shaft 6 of the transmission 5, and size increase of the vehicle can be prevented.

REFERENCE CHARACTERS LIST

1 Vehicle (motorcycle)
2 Drive wheel
4 Clutch operation member
5 Transmission
6 Input shaft
7 Output shaft
14 Clutch
20 Controller
25 Clutch sensor (third sensor)
26 Transmission sensor (first sensor, second sensor)
28 Biasing member
29 Holding mechanism
41 Clutch actuator
E Engine (internal combustion engine)
M Electric motor
R1 First power transmission route
R2 Second power transmission route
T1 Manual clutch actuation power transmission mechanism
T2 Controlled clutch actuation power transmission mechanism

The invention claimed is:

1. A hybrid vehicle comprising:
an internal combustion engine;
an electric motor;
a controller that controls the electric motor;
a transmission comprising an input shaft that receives power inputted from the internal combustion engine and the electric motor, an output shaft that outputs power to a drive wheel, gear trains through which the input shaft is coupled to the output shaft, and a dog member that engages with one of the gear trains selectively; and
a clutch disposed in a first power transmission route between the internal combustion engine and the input shaft, wherein
the electric motor is connected to the input shaft so as to transmit power to the input shaft through a second power transmission route different from the first power transmission route,
the controller changes the manner of controlling the electric motor upon switching of the state of power transmission from the internal combustion engine and the electric motor, and
in an engine-motor-driven travel mode, the controller controls the electric motor to weaken power transmission of the dog member upon detection of a gear shifting operation of the transmission.

2. The hybrid vehicle according to claim 1, wherein
the transmission is switchable to a neutral state, and
when the transmission is in the neutral state, the controller controls the electric motor in such a manner that the electric motor acts as an electricity generator to generate electricity from power transmitted to the electric motor from the internal combustion engine via the input shaft.

3. The hybrid vehicle according to claim 1, further comprising a first sensor that detects a gear shifting command to shift the transmission, the gear shifting command being given by a driver, wherein
upon detection of the gear shifting command by the first sensor, the controller controls the electric motor in such a manner that a difference in rotational speed between the input shaft and the output shaft becomes smaller than that occurring before the detection of the gear shifting command.

4. The hybrid vehicle according to claim 3, further comprising:
a second sensor that detects a neutral state of the transmission or detects a command to shift the transmission into the neutral state; and
a third sensor that detects which state the clutch is in or detects a command to actuate the clutch, wherein
the controller controls the electric motor based on outputs from the second sensor and the third sensor.

5. The hybrid vehicle according to claim 1, further comprising:
a manual clutch actuation power transmission mechanism that delivers an operation force of a driver as clutch actuation power to the clutch, and
a controlled clutch actuation power transmission mechanism that delivers power of a clutch actuator as clutch actuation power to the clutch.

6. The hybrid vehicle according to claim 1, further comprising:
a clutch operation member operated by a driver and movable between an operative position and an inoperative position;
a biasing member that biases the clutch operation member from the operative position toward the inoperative position; and
a holding mechanism configured to hold the clutch operation member in the operative position.

7. The hybrid vehicle according to claim 1, wherein the controller has a control period during which a circuit of the electric motor is opened to bring the electric motor into a free run state when the clutch is in a connection state and the transmission is in a non-neutral state.

8. The hybrid vehicle according to claim 1, wherein the hybrid vehicle is a motorcycle.

9. The hybrid vehicle according to claim 8, wherein
the electric motor is disposed in a space located rearward of a cylinder block of the internal combustion engine and above a crankcase of the internal combustion engine,
the crankcase houses the transmission, and
the electric motor has a drive shaft configured to transmit power to the input shaft of the transmission on one side in a vehicle width direction.

10. A method of operating a hybrid vehicle including an internal combustion engine, an electric motor, a transmission including an input shaft that receives power inputted from the internal combustion engine and the electric motor and an output shaft that outputs power to a drive wheel, gear trains through which the input shaft is coupled to the output shaft, and a dog member that engages with one of the gear trains selectively, and a clutch disposed between the internal combustion engine and the input shaft, the method comprising:

bringing the clutch into a disconnection state and the transmission into a non-neutral state to transmit power from the electric motor to the input shaft through a power transmission route different from the clutch and transmit power of the electric motor to the drive wheel;

bringing the clutch into a connection state and the transmission into a neutral state to transmit power of the internal combustion engine to the electric motor via the input shaft and cause the electric motor to generate electricity;

bringing the clutch into the connection state and the transmission into the non-neutral state to transmit power of the internal combustion engine and power of the electric motor to the drive wheel;

changing a manner of controlling the electric motor upon switching of the state of power transmission from the internal combustion engine and the electric motor; and controlling the electric motor to weaken power transmission of the dog member upon detection of a gear shifting operation of the transmission in an engine-motor-driven travel mode.

11. The method according to claim 10, further comprising varying a torque distribution between a torque generated by the engine and a torque generated by the electric motor according to a rotational speed of the input shaft in the engine-motor-driven travel mode.

12. The hybrid vehicle according to claim 1, wherein when the transmission is shifted during acceleration, the controller controls the electric motor such that a torque derived from the electric motor is momentarily reduced or a regenerative torque derived from the electric motor is momentarily generated.

13. The hybrid vehicle according to claim 1, wherein when the transmission is shifted during engine braking, the controller controls the electric motor such that a torque derived from the electric motor is momentarily increased.

14. The hybrid vehicle according to claim 1, wherein while power transmission between the input shaft and the output shaft is disabled, the controller controls the electric motor to reduce a difference in rotational speed between the output shaft and the input shaft.

15. The hybrid vehicle according to claim 1, wherein before the dog member makes the subsequent engagement, the controller controls the electric motor to provide a torque opposite in direction to that given to the input shaft from the engine.

16. A hybrid vehicle comprising:
an internal combustion engine;
an electric motor;
a controller that controls the electric motor;
a transmission comprising an input shaft that receives power inputted from the internal combustion engine and the electric motor and an output shaft that outputs power to a drive wheel; and
a clutch disposed in a first power transmission route between the internal combustion engine and the input shaft, wherein
the electric motor is connected to the input shaft so as to transmit power to the input shaft through a second power transmission route different from the first power transmission route,
the controller changes a manner of controlling the electric motor upon switching of a state of power transmission from the internal combustion engine and the electric motor,
the controller varies a torque distribution between a torque generated by the engine and a torque generated by the electric motor according to a rotational speed of the input shaft in an engine-motor-driven travel mode, and
in the engine-motor-driven travel mode, the controller controls the electric motor so that a torque generated by the electric motor at a low rotational speed lower than a predetermined threshold is higher than a torque generated by the electric motor at a high rotational speed equal to or higher than the predetermined threshold.

17. The hybrid vehicle according to claim 16, wherein the controller varies the torque distribution between a torque generated by the engine and a torque generated by the electric motor with respect to a required torque in the engine-motor-driven travel mode.

18. The hybrid vehicle according to claim 16, wherein upon detection of an acceleration operation, the controller controls the electric motor to enhance output assistance of the electric motor in the engine-motor-driven travel mode.

19. The hybrid vehicle according to claim 16, wherein the controller controls the electric motor to reduce torsional vibration of the input shaft upon determination of a situation where the torsional vibration of the input shaft is likely to occur.

* * * * *